US009487616B2

(12) United States Patent
Pirkl et al.

(10) Patent No.: US 9,487,616 B2
(45) Date of Patent: Nov. 8, 2016

(54) LIGHTLY MODIFIED PREPOLYMERS AND USES THEREOF

(75) Inventors: Hans-Georg Pirkl, Leverkusen (DE); Manfred Schmidt, Dormagen (DE); Reinhard Albers, Leverkusen (DE); Johannes Braak, Hennef (DE); Rolf Roers, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 935 days.

(21) Appl. No.: 13/809,147

(22) PCT Filed: Jul. 11, 2011

(86) PCT No.: PCT/EP2011/061738
§ 371 (c)(1),
(2), (4) Date: Mar. 29, 2013

(87) PCT Pub. No.: WO2012/007418
PCT Pub. Date: Jan. 19, 2012

(65) Prior Publication Data
US 2013/0183880 A1    Jul. 18, 2013

(30) Foreign Application Priority Data

Jul. 13, 2010 (DE) .................... 10 2010 027 052
May 9, 2011 (DE) .................... 10 2011 050 220

(51) Int. Cl.
| C08G 18/42 | (2006.01) |
| C08G 18/83 | (2006.01) |
| C08G 18/10 | (2006.01) |
| C08G 18/44 | (2006.01) |
| C08G 18/48 | (2006.01) |
| C08G 18/50 | (2006.01) |
| C08G 18/76 | (2006.01) |
| B32B 5/18 | (2006.01) |
| B32B 15/04 | (2006.01) |
| B32B 15/18 | (2006.01) |
| B32B 27/06 | (2006.01) |
| B32B 27/40 | (2006.01) |
| C08G 101/00 | (2006.01) |

(52) U.S. Cl.
CPC ............. *C08G 18/4216* (2013.01); *B32B 5/18* (2013.01); *B32B 15/046* (2013.01); *B32B 15/18* (2013.01); *B32B 27/06* (2013.01); *B32B 27/40* (2013.01); *C08G 18/10* (2013.01); *C08G 18/44* (2013.01); *C08G 18/4833* (2013.01); *C08G 18/4841* (2013.01); *C08G 18/4887* (2013.01); *C08G 18/5024* (2013.01); *C08G 18/7664* (2013.01); *C08G 18/831* (2013.01); *B32B 2266/0278* (2013.01); *C08G 2101/0025* (2013.01); *C08G 2105/02* (2013.01); *Y10T 428/31547* (2015.04); *Y10T 442/674* (2015.04)

(58) Field of Classification Search
CPC ...... C08G 18/10; C08G 18/40; C08G 18/44; C08G 18/4833; C08G 18/4841; C08G 18/4887; C08G 18/5024; C08G 18/7664; C08G 18/4216; C08G 2101/0025; C08G 2105/02; B32B 5/18; B32B 15/046; B32B 15/18; B32B 27/06; B32B 27/40; B32B 2266/0278; Y10T 442/674; Y10T 428/31547; Y10T 428/31551; Y10T 428/31591; Y10T 428/31605; Y10T 428/31641
USPC .......... 428/425.1, 425.8, 438, 440; 442/394; 525/424
See application file for complete search history.

(56) References Cited

U.S. PATENT DOCUMENTS

| 5,151,484 A | 9/1992 | Schmalstieg et al. |
| 5,962,541 A * | 10/1999 | Peterson et al. .............. 521/131 |
| 6,071,978 A * | 6/2000 | Eisen et al. ................... 521/131 |
| 2006/0058455 A1* | 3/2006 | Michels ................ C08G 18/10 524/589 |
| 2007/0282028 A1 | 12/2007 | Harre et al. |
| 2008/0188582 A1 | 8/2008 | Lehmann et al. |
| 2012/0225278 A1* | 9/2012 | Van De Braak et al. . 428/316.6 |

FOREIGN PATENT DOCUMENTS

| CA | 2362505 A1 | 8/2000 |
| CN | 101160333 A | 4/2008 |
| DE | 28 23 762 A1 | 12/1978 |
| DE | 196 01 410 A1 | 7/1997 |
| DE | 198 23 392 A1 | 12/1999 |
| DE | 691 32 613 T2 | 10/2001 |
| EP | 0 497 131 A2 | 8/1992 |

(Continued)

OTHER PUBLICATIONS

International Search Report of PCT/EP2011/061738 Dated Sep. 22, 2011.

*Primary Examiner* — Thao T Tran
(74) *Attorney, Agent, or Firm* — K&L Gates LLP

(57) ABSTRACT

An isocyanate-terminated prepolymer C having an NCO content of from ≥26% by mass to ≤31.0% by mass is obtainable from the reaction of an isocyanate composition A having a viscosity at 25° C. of from ≥60 mPas to ≤800 mPas, comprising from ≥25% by mass to ≤60% by mass MDI and from ≥40% by mass to ≤75% by mass pMDI, wherein the sum of the amounts of those components is ≤100% by mass, with a bifunctional polyester ether polyol B having an OH number of ≥200 mg(KOH)/g and ≤500 mg(KOH)/g, obtained from the reaction of a dicarboxylic acid/dicarboxylic acid derivative with at least one polyol and with an epoxide, wherein the polyester ether polyol B is used in amounts of from ≥1.5% by mass to ≤6.0% by mass, based on the sum of the masses of A and B. The invention further provides a PUR/PIR polymer produced from the prepolymer C, its use and composite elements based thereon.

19 Claims, No Drawings

(56) References Cited

FOREIGN PATENT DOCUMENTS

| | | |
|---|---|---|
| JP | 2002536516 A | 10/2002 |
| JP | 2008535989 A | 9/2008 |
| RU | 2181152 C2 | 4/2004 |
| RU | 2275390 C2 | 4/2006 |
| RU | 2291162 C2 | 1/2007 |
| WO | 94/29361 | 12/1994 |
| WO | 2006/108833 | 10/1999 |
| WO | 2009/055436 A1 | 4/2009 |

* cited by examiner

LIGHTLY MODIFIED PREPOLYMERS AND USES THEREOF

CROSS REFERENCE TO RELATED APPLICATIONS

This application is a §371 National Stage Application of PCT/EP2011/061738, filed Jul.7, 2011, which claims priority to German Application No. 10 2010 027 052.0 filed Jul. 13, 2010 and German Application No. 10 2011 050 220.3 filed Mar. 9, 2011.

BACKGROUND OF THE INVENTION

1. Field of the Invention

The present invention relates to an isocyanate-terminated prepolymer having an NCO content of from ≥26.0% by mass to ≤31.0% by mass, which is obtainable from the reaction of an isocyanate composition comprising from ≥30% by mass to ≤60% by mass dinuclear MDI and from ≥40% by mass to ≤70% by mass polymeric MDI with a bifunctional polyester ether polyol, which is obtained from the reaction of a dicarboxylic acid/dicarboxylic acid derivative with at least one polyol and with an epoxide. The invention further provides a PUR/PIR polymer prepared from this prepolymer, its use, and composite elements based thereon.

2. Description of Related Art

In the field of metal composite elements for the construction of factory buildings, high and permanent adhesion of the insulating foam to the metal cover layer is required. This is true in particular for polyisocyanurate foams. To that end there can be used as starting materials isocyanate-group-containing polyurethane prepolymers, which are obtained by reaction of a stoichiometric excess of an organic polyisocyanate with an organic polyol. Such prepolymers are well known in the field of polyurethanes and are used, for example, in the production of flexible and rigid foams and of elastomers, coatings, adhesive agents and the like.

The preparation of such NCO prepolymers has been described in many specifications. DE 69132613 T2, for example, discloses a process for the production of flexible foams which comprises the following steps:

continuously delivering an organic polyisocyanate composition and an isocyanate-reactive compound having an average molecular weight of at least 1000, and optionally a catalyst, to a reaction zone, the relative proportions of the isocyanate composition and of the isocyanate-reactive compound being suitable for the formation of a prepolymer having an NCO content in the range of from 2 to 15 wt. %;

reacting the isocyanate composition and the isocyanate-reactive compound in the reaction zone to form an isocyanate-terminated prepolymer;

continuously removing the reaction mixture from the reaction zone;

if necessary, allowing the reaction mixture to mature to form a prepolymer having an NCO content in the range of from 2 to 15 wt. %;

delivering the prepolymer to a foam-forming zone;

reacting the prepolymer in the foam-forming zone with an isocyanate-reactive component comprising water; and recovering the foam so formed, the reaction zone also being used as the foam-forming zone.

WO 94/29361 A1 describes a process for the production of flexible foam, in which a prepolymer having an NCO content of from 5 to 10 wt. % is used. The prepolymer is the reaction product of an excess of polyisocyanate having at least 85 wt. % 4,4'-diphenylmethane diisocyanate or a variant thereof with a polyol which has a nominal hydroxyl functionality of from 2.5 to 3.5, an average hydroxyl equivalent weight of from 1000 to 3000 and an oxyethylene content of from 50 to 85 wt. %. The prepolymer is reacted with water, the amount of water being at least 20 parts by weight per 100 parts by weight of the prepolymer.

DE 2823762 A1 relates to a process for the continuous preparation of thermoplastic polyurethanes from polyhydroxy compounds, diisocyanates and low molecular weight chain extenders, in which the starting components are passed through a mixing zone and then through a reaction zone. The starting components are mixed in a mixing zone in which virtually complete mixing sufficient for the subsequent polyaddition reaction is carried out. The product temperature is so low that a reaction of the components is largely avoided. The mixture is then fed by means of a precision pump into a static mixture of such a length and diameter that, at a flow rate that prevents the formation of polymers, the reaction components remain in the static mixer for a sufficient time that polyaddition takes place.

DE 19823392 A1 discloses a process for the preparation of isocyanate-group-containing prepolymers by reaction of organic isocyanates with H-acidic compounds, which process is characterised in that the reaction to the prepolymer takes place directly in the process stream of the isocyanate-producing plant. The publication additionally provides the isocyanate-group-containing prepolymers so prepared, their use in the production of PUR, and a process for the production of PUR by reaction of at least one isocyanate-group-containing prepolymer, optionally in admixture with further organic and/or modified organic isocyanates, with compounds having at least two reactive hydrogen atoms optionally in the presence of foaming agents, catalysts and optionally also further auxiliary substances and/or additives.

EP 0 497 131 A2 discloses isocyanate prepolymers containing ether and ester groups and having an NCO content of from 1.9 to 25 wt. % based on A) a polyisocyanate component consisting of at least one organic polyisocyanate having a mean molecular weight of from 168 to 1000, B) esterification products of polyether polyols having a mean hydroxyl number of from 200 to 600 with monocarboxylic acids, optionally in admixture with minor amounts of polybasic carboxylic acids, and optionally C) organic polyhydroxyl compounds of the molecular weight range from 62 to 200 in an amount of up to 25 hydroxyl equivalent %, based on component B), a process for the preparation of such isocyanate prepolymers by reaction of the mentioned starting materials while maintaining an NCO/OH equivalent ratio of from 1.7:1 to 20:1, and the use of the isocyanate prepolymers as binder or binder component in polyurethane coating compositions, sealing compositions or casting compositions.

DE 196 01 410 A1 relates to a process for the production of flexible polyurethane foams by reaction of a) organic and/or modified organic NCO-group-containing compounds with b) higher molecular weight compounds having at least two reactive hydrogen atoms and c) optionally low molecular weight chain extenders and/or crosslinkers in the presence of d) foaming agents, e) catalysts, f) flame retardants and optionally g) further auxiliary substances and/or additives. As organic and/or modified organic NCO-group-containing compounds there are used NCO-group-containing prepolymers which are reaction products of polyester polyols and/or polyester ether polyols and aromatic diisocyanates and which are subjected to a special after-treatment.

WO 2009/055436 A1 relates to polyester ether polyols and their use in urethane prepolymers, urethane foams and non-foamed urethane coatings, adhesives, sealing compositions and/or elastomers. Processes for the preparation of such polyester ether polyols with double metal cyanide catalysis and for the preparation of urethane prepolymers are described. The polyester ether polyols described therein are preferably the reaction product of phthalic anhydride, diethylene glycol and propylene oxide. The polyester ether polyols have improved solubility and compatibility in mixtures of either polyether polyols and/or polyester polyols. The polyester ether polyols are preferably less viscous than the polyester polyol intermediates and are generally soluble in either polyester and/or polyether polyols. In addition, the polyester ether polyols improve the hydrolytic stability of coatings, adhesives, sealing compositions and elastomers in which they are used.

The processes described in the prior art for the preparation of NCO prepolymers accordingly require a reaction of an isocyanate-group-containing component with an isocyanate-group-reactive component in a reactor and in particular under controlled mixing and temperature conditions.

SUMMARY

The object underlying the present invention was, therefore, to provide NCO prepolymers which can be prepared simply and quickly, the PUR or PUR/PIR foams produced from the prepolymers having a very good adhesion of at least 0.2 N/mm$^2$ to metal cover layers in metal composite elements.

The object is achieved according to the invention by an isocyanate-terminated prepolymer C having an NCO content of from ≥26.0% by mass to ≤31.0% by mass, based on the mass of the prepolymer C, obtainable from the reaction of
(i) an isocyanate composition A having a viscosity at 25° C. of from ≥60 mPas to ≤800 mPas, comprising from ≥25% by mass to ≤60% by mass monomeric diphenylmethane diisocyanate (MDI) A1 and from ≥40% by mass to ≤75% by mass polymeric diphenylmethane diisocyanate (pMDI) A2, wherein the sum of the amounts of components A1 and A2 is ≤100% by mass, with
(ii) a polyester ether polyol B having an average functionality of from ≥1.9 to ≤2.1 and an OH number of from ≥200 mg(KOH)/g to ≤500 mg(KOH)/g, obtained from the reaction of a dicarboxylic acid and/or a dicarboxylic acid derivative B1 with at least one polyol B2 and with an epoxide B3,
wherein the polyester ether polyol B is used in amounts of from ≥1.5% by mass to ≤6.0% by mass, based on the sum of the masses of A and B.

DETAILED DESCRIPTION OF A PREFERRED EMBODIMENT

Surprisingly, it has been found that the isocyanate-group-containing component A in stoichiometric excess and an isocyanate-group-reactive component B in a less than stoichiometric amount can be combined continuously at room temperature or elevated temperatures of up to 100° C. in a mixing device and react reproducibly to form an isocyanate-group-containing prepolymer. Alternatively, component A can be placed in a reaction vessel and reacted with component B at from room temperature to 100° C. The isocyanate-group-containing prepolymer is likewise formed.

Surprisingly, it has further been found that the PUR/PIR foams produced from the slightly modified isocyanate according to the invention exhibit improved adhesion in metal composite elements as compared with the foams produced using unmodified isocyanates.

As a result of the excess of the NCO component A, a prepolymer with free NCO end groups is obtained. The NCO content is preferably from ≥27.0% by mass to ≤30.0% by mass, more preferably from ≥27.5% by mass to ≤29.5% by mass, and can be determined on the basis of ISO 14896.

Preferably, the polyester ether polyol B is used in amounts of from ≥2.0% by mass to ≤5% by mass and more preferably from ≥2.5% by mass to ≤4% by mass, based on the sum of the masses of A and B.

There can be used as the polyisocyanate A commercial mixtures of monomeric MDI and polymeric MDI. The viscosity at 25° C. an be determined on the basis of DIN 53019 Part 1 and is preferably from ≥80 mPas to ≤500 mPas, more preferably from ≥90 mPas to ≤300 mPas.

Within the scope of the present invention, the terms "monomeric MDI" and "dinuclear MDI" are used synonymously. Further, "polymeric MDI" denotes dimeric and trimeric adducts and higher homologues of monomeric MDI.

The composition thereof is preferably from ≥35% by mass to ≤55% by mass monomeric MDI and from ≥45% by mass to ≤65% by mass polymeric MDI, the sum of those amounts again being ≤100% by mass. Further preference is given to from ≥40% by mass to ≤50% by mass monomeric MDI and from ≥50% by mass to ≤60% by mass polymeric MDI.

Suitable polyester ether polyols B are preferably alkoxylation products of oligo- and poly-esters of aromatic and aliphatic dicarboxylic acids and dicarboxylic acid derivatives B1 such as, for example, anhydrides with isocyanate-reactive end groups. Polyester ether polyols can be prepared by purposive synthesis, for example by alkoxylation of carboxylic acids or carboxylic acid anhydrides or polyesters, or by molecule-doubling condensation of OH-terminated polyesters. These compounds can likewise be reacted with epoxides by known methods.

The OH number of the polyester ether polyol B is preferably from ≥250 mg(KOH)/g to ≤380 mg(KOH)/g, particularly preferably from ≥280 mg(KOH)/g to ≤350 mg(KOH)/g and most particularly preferably from ≥300 mg(KOH)/g to ≤320 mg(KOH)/g. It can be determined according to DIN 53240 ("Determination of the hydroxyl number").

The average functionality $F_N$ of the polyol B is from 1.9 to 2.1, preferably from 1.95 to 2.05 and most particularly preferably 2.0.

The polyester ether polyols B that are used can comprise as starter molecules B1, for example, adipic acid, maleic acid, fumaric acid, phthalic acid, terephthalic acid, isophthalic acid, tetrahydrophthalic acid, halogenated phthalic and tetrahydrophthalic acids and derivatives thereof. Preferred carboxylic acids are adipic acid, maleic acid, fumaric acid and derivatives thereof, particular preference being given to phthalic acid, terephthalic acid and isophthalic acid and derivatives thereof Preferred carboxylic acid derivatives are in particular the carboxylic acid anhydrides thereof.

The starter molecules B2 used in addition to the carboxylic acids or carboxylic acid derivatives are secondary products of ethylene oxide and propylene oxide such as, for example, ethylene glycol, diethylene glycol, triethylene glycol, 1,2-propylene glycol, dipropylene glycol or the primary alcohols such as, for example, 1,4-butanediol, 1,6-hexanediol, neopentyl glycol, 1,3-butanediol or branching triol components such as trimethylolpropane, trimethylolethane or glycerol.

Preferred epoxides B3 are ethylene oxide and/or propylene oxide.

Embodiments of the present invention are described hereinbelow, it being possible for the individual embodiments to be combined freely with one another provided the contrary is not clearly apparent from the context.

In an embodiment of the prepolymer according to the invention, it has a viscosity at 25° C. of from ≥300 mPas to ≤1600 mPas. The viscosity is preferably in a range of from ≥350 mPas to ≤1400 mPas, particularly preferably from ≥500 mPas to ≤1000 mPas. It can be determined on the basis of DIN 53019 Part 1.

In a further embodiment of the prepolymer according to the invention, component A has a viscosity at 25° C. of from ≥90 mPas to ≤300 mPas and an NCO content of from ≥30% by mass to ≤33% by mass. The viscosity (DIN 53019 Part 1) is preferably in a range of from ≥160 mPas to ≤240 mPas, more preferably from ≥170 mPas to ≤230 mPas. The NCO content (ISO 14896) can preferably be from ≥30.5% by mass to ≤32.5% by mass.

In a further embodiment of the prepolymer according to the invention, the polyester ether polyol B is obtained from the reaction of phthalic anhydride as component B1, diethylene glycol as component B2 and ethylene oxide as component B3. Ethoxylated amines can be used as catalysts. Such catalysts can remain in the polyester ether polyol without adversely affecting the prepolymer preparation.

The present invention further provides a polyurethane/polyisocyanurate polymer obtainable from the reaction of a prepolymer C according to the invention with an isocyanate-reactive component D. Such a polymer can be used as insulating foam and/or adhesion promoter in particular in the production of metal composite elements. The conventional additives known to the person skilled in the art, such as surfactants, flame retardants, fillers and the like, can be added. Regarding the details of the prepolymer, reference is made to the entirety of the above comments in order to avoid repetition.

Examples of the isocyanate-reactive component D are polyether polyamines and/or preferably polyols selected from the group of the polyether polyols, polyester polyols, polythioether polyols, polyester amides, the hydroxyl-group-containing polyacetals and hydroxyl-group-containing aliphatic polycarbonates or mixtures of at least two of the mentioned polyols. Polyester polyols and/or polyether polyols are preferably used.

Suitable polyester polyols can be prepared, for example, from organic dicarboxylic acids having from 2 to 12 carbon atoms, preferably dicarboxylic acids having from 4 to 6 carbon atoms, and polyhydric alcohols, preferably diols, having from 2 to 12, preferably from 2 to 6, carbon atoms.

There come into consideration as dicarboxylic acids, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used both individually and in admixture with one another. Instead of the free carboxylic acids it is also possible to use the corresponding dicarboxylic acid derivatives, such as, for example, dicarboxylic acid esters of alcohols having from 1 to 4 carbon atoms or dicarboxylic acid anhydrides. Examples of di- and poly-hydric alcohols, in particular diols, are: ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Ethanediol, diethylene glycol, 1,4-butanediol, 1,5-pentanediol and 1,6-hexanediol are preferably used. It is also possible to use polyester polyols of lactones, for example ε-caprolactone, or hydroxycarboxylic acids, for example ω-hydroxycaproic acid.

For the preparation of the polyester polyols, the organic, for example aromatic and preferably aliphatic, polycarboxylic acids and/or derivatives and polyhydric alcohols can be subjected to polycondensation without a catalyst or preferably in the presence of esterification catalysts, advantageously in an atmosphere of inert gas, such as, for example, nitrogen, carbon monoxide, helium, argon, etc., in the melt at temperatures of from 150 to 250° C., preferably from 180 to 220° C., optionally under reduced pressure, to the desired acid number, which is advantageously less than 10, preferably less than 2. According to a preferred embodiment, the esterification mixture is subjected to polycondensation at the above-mentioned temperatures to an acid number of from 80 to 30 mg KOH/g, preferably from 40 to 30 mg KOH/g, under normal pressure and then under a pressure of less than 500 mbar, preferably from 50 to 150 mbar. There come into consideration as esterification catalysts, for example, iron, cadmium, cobalt, lead, zinc, antimony, magnesium, titanium and tin catalysts in the form of metals, metal oxides or metal salts. The polycondensation can, however, also be carried out in liquid phase in the presence of diluting and/or entraining agents, such as, for example, benzene, toluene, xylene or chlorobenzene, for the azeotropic distillation of the condensation water.

For the preparation of the polyester polyols, the organic polycarboxylic acids and/or derivatives and polyhydric alcohols are advantageously subjected to polycondensation in a molar ratio of 1:1 to 1.8, preferably 1:1.05 to 1.2.

The polyester polyols obtained preferably have a functionality of from 2 to 4, in particular from 2 to 3, and a molecular weight of from 480 to 3000 g/mol, in particular from 600 to 2000 g/mol.

The polyether polyols are prepared from one or more alkylene oxides having from 2 to 4 carbon atoms in the alkylene moiety by known processes, for example by anionic polymerisation with alkali hydroxides, such as, for example, sodium or potassium hydroxide, or alkali alcoholates, such as, for example, sodium methylate, sodium or potassium ethylate or potassium isopropylate, as catalysts and with the addition of at least one starter molecule which contains from 2 to 4, preferably from 2 to 3, reactive hydrogen atoms bonded therein, or by cationic polymerisation with Lewis acids, such as antimony pentachloride, boron fluoride etherate, etc. or fuller's earth, as catalysts.

Suitable alkylene oxides are, for example, tetrahydrofuran, 1,3-propylene oxide, 1,2- and 2,3-butylene oxide, styrene oxide and, preferably, ethylene oxide and 1,2-propylene oxide. There come into consideration as starter molecules, for example: water, organic dicarboxylic acids, such as succinic acid, adipic acid, phthalic acid and terephthalic acid, aliphatic and aromatic, optionally N-mono-, N,N- and N,N'-di-alkyl-substituted diamines having from 1 to 4 carbon atoms in the alkyl moiety, such as optionally mono- and di-alkyl-substituted ethylenediamine, diethylentriamine, triethylenetetramine, 1,3-propylenediamine, 1,3- and 1,4-butylenediamine, 1,2-, 1,3-, 1,4-, 1,5- and 1,6-hexamethylenediamine, phenylenediamine, 2,3-, 2,4- and 2,6-toluylenediamine and 4,4'-, 2,4'- and 2,2'-diaminodiphenylmethane. There come into consideration as starter molecules also: alkanolamines, such as, for example, ethanolamine, N-methyl- and N-ethyl-ethanolamine, dialkanolamines, such as, for example, diethanolamine, N-methyl- and N-ethyl-diethanolamine, and trialkanolamines, such as, for example, triethanolamine, and ammonia. There are preferably used polyhydric, in particular di- and/or tri-hydric, alcohols, such as ethanediol, 1,2- and 2,3-propanediol, diethylene glycol, dipropylene glycol, 1,4-butanediol, 1,6-hexanediol, glycerol, trimethylolpropane and pentaerythritol, while predominantly higher functional starters, such as, for example, sorbitol and sucrose, are used for rigid foam polyetherols.

The polyether polyols, preferably polyoxypropylene- and polyoxypropylenepolyoxyethylene-polyols, have, for example, a functionality of preferably from 2 to 4 and in particular from 2 to 3 and molecular weights of from 300 g/mol to 8000 g/mol, preferably from 300 g/mol to 6000 g/mol and in particular from 1000 g/mol to 5000 g/mol, and suitable polyoxytetramethylene glycols have a molecular weight of up to approximately 3500 g/mol, while molecular weights of from 300 g/mol to 1000 g/mol are usual in the case of rigid foam polyetherols.

There are further suitable as polyether polyols polymer-modified polyether polyols, preferably graft polyether polyols, in particular those based on styrene and/or acrylonitrile, which are prepared by in situ polymerisation of acrylonitrile, styrene or preferably mixtures of styrene and acrylonitrile, for example in a weight ratio of from 90:10 to 10:90, preferably from 70:30 to 30:70, in advantageously the above-mentioned polyether polyols analogous to the information given in DE 11 11 394, DE 12 22 669 (U.S. Pat. Nos. 3,304,273, 3,383,351, 3,523,093), DE 11 52 536 (GB 1040452) and DE 11 52 537 (GB 987618), as well as polyether polyol dispersions which contain as the disperse phase, usually in an amount of from 1 to 50 wt. %, preferably from 2 to 25 wt. %, for example: polyureas, polyhydrazides, polyurethanes containing tertiary amino groups bonded therein, and/or melamine and which are described, for example, in EP-B-011 752 (U.S. Pat. No. 4,304,708), U.S. Pat. No. 4,374,209 and DE-A-32 31 497.

In an embodiment of the polyurethane/polyisocyanurate polymer according to the invention, the molar ratio of isocyanate groups to hydroxyl groups in the reaction mixture of components C and D is from $\geq 1:1$ to $\leq 5:1$. In other words, the index of this reaction mixture is from 100 to 500. The index can also be from $\geq 120$ to $\leq 450$ and preferably from $\geq 180$ to $\leq 420$. With such indices there are predominantly obtained polyisocyanurate foams that require smaller amounts of flame retardants and nevertheless can be bonded firmly to cover layers, in particular aluminium cover layers.

In a further embodiment of the polyurethane/polyisocyanurate polymer according to the invention, the reaction of the prepolymer C with the isocyanate-reactive component D takes place in the presence of a foaming agent E. Preferred foaming agents are $CO_2$, n-pentane, isopentane and/or cyclopentane. The foam so obtained is preferably a rigid polyisocyanurate foam, defined on the basis of its compressive stress at 10% compression or from $\geq 100$ kPa to $\leq 300$ kPa. The compressive stress or compressive strength can be determined according to DIN 53421/DIN EN ISO 604. It can also be in a range of from $\geq 150$ kPa to $\leq 250$ kPa or from $\geq 180$ kPa to $\leq 280$ kPa.

In a further embodiment of the polyurethane/polyisocyanurate polymer according to the invention, the isocyanate-reactive component D comprises from $\geq 50\%$ by mass to $\leq 95\%$ by mass of a polyester polyol D1 and from $\geq 5\%$ by mass to $\leq 50\%$ by mass of a polyether polyol D2, in each case based on the total mass of component D, and the sum of the amounts of components D1 and D2 is further $\leq 100\%$ by mass. Included according to the invention are mixtures of a plurality of polyester polyols D1 and polyether polyols D2. Preferred ranges for the amount of polyester polyol D1 are from $\geq 85\%$ by mass to $\leq 92\%$ by mass and for the amount of polyether polyol D2 from $\geq 6\%$ by mass to $\leq 10\%$ by mass.

The polyester polyol D1 can preferably be obtained by a process in which
a) at least one carboxylic acid anhydride (A') and diethylene glycol (B') are mixed, wherein the molar ratio of components (B') to (A') is in the range from 1.5 to 1.0 to 0.7 to 1.0 and the amount by weight of components (A') and (B'), based on the weight of all the components of the mixture, is in the range from 66 to 90 wt. %, and in a step
b) diethylene glycol (B') is added to the polyester polyol from step a),
wherein the polyester polyol from step a) has a higher molar mass than the polyester polyol from step b).

In step a), at least one $C_2$-$C_4$ glycol (C') and at least one aliphatic $C_5$-$C_{12}$ dicarboxylic acid (D') or at least one $C_5$-$C_{10}$ glycol (E') and at least one $C_4$ dicarboxylic acid (F') are added.

The amounts of components (C'), (D'), (E') and (F') in step a) are so chosen that the sum of the amounts of all the components (A'), (B'), (C') and (D') or (E') and (F') in the mixture is $\leq 100$ wt.%.

In a preferred embodiment, the carboxylic acid anhydride (A') is aromatic.

Preferably, the carboxylic acid anhydride (A') is selected from the group consisting of phthalic anhydride, trimellitic anhydride and pyromellitic anhydride. The carboxylic acid anhydride is particularly preferably phthalic anhydride.

By replacing small amounts of aromatic dicarboxylic acids with an equivalent amount of an aliphatic dicarboxylic acid (D' or F') and replacing small amounts of diethylene glycol with equivalent amounts of the glycols (C') or (E'), the amount of dioxane lost in the preparation of the polyester polyols is reduced far beyond the extent to be expected as a result of the dilution effect. The properties of the polyester polyol that is produced remain almost the same, that is to say polyester polyols produced by the process according to the invention have the same properties as corresponding polyester polyols produced without the addition of aliphatic dicarboxylic acids (D' or F') and without the addition of the glycols (C') or (E').

Preferably, the $C_2$-$C_4$ glycol (C') is selected from the group consisting of ethylene glycol, 1,3-propanediol, 2-methyl-1,3-propanediol, 1,2-propanediol. The $C_2$-$C_4$ glycol (C') is particularly preferably ethylene glycol.

Preferably, the aliphatic $C_5$-$C_{12}$ dicarboxylic acid (D') is selected from the group consisting of glutaric acid, adipic acid, pimelic acid, suberic acid, azelaic acid, sebacic acid, undecanedioic acid and dodecanedioic acid. Adipic acid or sebacic acid is particularly preferred as the $C_5$-$C_{12}$ dicarboxylic acid (D').

Preferably, the $C_5$-$C_{10}$ glycol (E') is selected from the group consisting of 1,5-pentanediol, 3-methyl-1,5-pentanediol, 1,6-hexanediol and 1,8-octanediol. The $C_5$-$C_{10}$ glycol (E') is particularly preferably 3-methyl-1,5-pentanediol or 1,6-hexanediol.

Preferably, the $C_4$ dicarboxylic acid (F') is selected from the group consisting of succinic acid, fumaric acid and maleic acid. The $C_4$ dicarboxylic acid (F') is particularly preferably succinic acid.

In an embodiment of the polyurethane/polyisocyanurate polymer according to the invention, the polyester polyol D1 has an average functionality of from $\geq 1.9$ to $\leq 2.1$ and an OH number of from ≥220 mg(KOH)/g to ≤270 mg(KOH)/g and is further obtained from the reaction of phthalic acid and/or phthalic anhydride and adipic acid, diethylene glycol and ethylene glycol. The preparation can be carried out as described above.

In an embodiment of the polyurethane/polyisocyanurate polymer according to the invention, the polyether polyol D2 is a polyoxyethylene and/or polyoxypropylene polyol started on trimethylolpropane and having an OH number of from ≥200 mg(KOH)/g to ≤300 mg(KOH)/g. The OH number can be determined according to DIN 53240. OH numbers of from ≥225 mg(KOH)/g to ≤275 mg(KOH)/g are preferred. The preparation can be carried out as described above.

The present invention relates likewise to a composite element that comprises a layer comprising a polyurethane/polyisocyanurate polymer according to the invention and a cover layer. The cover layer is in contact at least partly with the layer comprising a polyurethane/polyisocyanurate polymer according to the invention. Preferably, the polyurethane/polyisocyanurate polymer is in the form of a rigid foam. Such composite elements are suitable, for example, for the construction of factory buildings. Regarding details of the prepolymer or of the polymer, reference is made to the entirety of the above comments in order to avoid repetition.

The material of the cover layer is preferably aluminium, steel, bitumen, paper, a mineral nonwoven, a nonwoven comprising organic fibres, a plastics sheet, a plastics film and/or a wooden panel. It is particularly preferred for the cover layer to be aluminium metal or steel. The aluminium or steel can be coated. The modified isocyanates used according to the invention result in particularly good adhesion in particular between the polyurethane/polyisocyanurate foam and the aluminium cover sheet or steel cover sheet.

In a foam composite element according to the invention, the adhesion between the layer comprising a polyurethane/polyisocyanurate polymer according to the invention and the cover layer can be ≥0.20 N/mm². Preferably, the adhesion is from ≥0.20 N/mm² to ≤0.50 N/mm², particularly preferably from ≥0.22 N/mm² to ≤0.45 N/mm², most particularly preferably from ≥0.25 N/mm² to ≤0.40 N/mm². The adhesion is advantageously measured according to DIN 53292, as described below.

Accordingly, the invention further provides the use of a polyurethane/polyisocyanurate polymer according to the invention as an insulating foam and/or as an adhesion promoter in composite elements, wherein the composite elements comprise a layer comprising a polyurethane/polyisocyanurate polymer according to the invention and a cover layer. The cover layer is in contact at least partly with the layer comprising a polyurethane/polyisocyanurate polymer according to the invention.

The invention is explained further by means of the following examples, without being limited thereto.

Glossary:
44V20L: Desmodur® 44 V 20 L, mixture of 4,4'-diphenylmethane diisocyanate (MDI) and higher functional homologues (pMDI) having a viscosity at 25° C. of from ≥160 mPas to ≤240 mPas; Bayer MaterialScience AG. The product contains about 45% dinuclear MDI.

44V70L: Desmodur® 44 V 70 L, mixture of 4,4'-diphenylmethane diisocyanate (MDI) and higher functional homologues (pMDI) having a viscosity at 25° C. of from ≥610 mPas to ≤750 mPas; Bayer MaterialScience AG. The product contains about 34% dinuclear MDI.

Polyol 1: Polyester polyol based on adipic acid, phthalic acid and diethylene glycol having an OH number of about 210 mg(KOH)/g and a viscosity of 10.4 Pa s at 20° C.; Bayer MaterialScience AG.

Polyol 2: Bifunctional polyester ether polyol, EO adduct to a mixture of phthalic anhydride, diethylene glycol and ethylenediamine having an OH number of from 275 to 325 mg(KOH)/g and a viscosity of 6.5 +/−1.3 Pa s at 25° C.; Bayer MaterialScience AG.

Polyol 3: Diethylene glycol, OH number 1055 mg(KOH)/g, viscosity 38 mPa s at 20° C.

EXAMPLE 1

General Description of the Preparation of the Prepolymers 19.0 t of 44V20L with 200 mPa s viscosity at 25° C. and an NCO content of 31.2% were metered in the course of 2 hours into a stirred vessel reactor with an external heat exchanger and a recirculation loop. The isocyanate was heated to 70° C. The polyol addition of 1.0 t over a period of one hour was then carried out. The reaction temperature was kept constant at 70° C. during the addition. After a post-reaction time of 30 minutes, a sample was taken and tested in the laboratory. The released reaction batch was cooled and could then be pumped into a tank lorry.

EXAMPLE 2

With reference to Example 1, the general preparation procedure, the syntheses described in the following table were carried out. In the terminology of the present invention, they are the syntheses of isocyanate-terminated prepolymers C.

Syntheses according to the invention are those with polyol 2 (in the terminology of the present invention, polyester ether polyol B), and syntheses not according to the invention are those with polyol 1 and polyol 3 as polyol components. In all cases, the isocyanate component was 44V20L (in the terminology of the present invention, isocyanate component A).

|  | Example number | | | | | | |
| --- | --- | --- | --- | --- | --- | --- | --- |
|  | 2-1 | 2-2 | 2-3 | 2-4 | 2-5 | 2-6 | 2-7 |
|  | | | | Polyol | | | |
|  | Polyol 1 | Polyol 2 | Polyol 2 | Polyol 2 | Polyol 2 | Polyol 2 | Polyol 3 |
| Amount by weight polyol integral | 5.0 | 4.0 | 4.0 | 3.5 | 3.5 | 3.5 | 1.5 |
| Mass isocyanate [kg] | 427 | 384 | 384 | 386 | 386 | 347 | 394 |

-continued

| | Example number | | | | | | |
|---|---|---|---|---|---|---|---|
| | 2-1 | 2-2 | 2-3 | 2-4 | 2-5 | 2-6 | 2-7 |
| Polyol | Polyol 1 | Polyol 2 | Polyol 2 | Polyol 2 | Polyol 2 | Polyol 2 | Polyol 3 |
| Mass polyol [kg] | 23 | 16 | 17.7 | 14.5 | 14.5 | 12.6 | 6 |
| Temperature isocyanate [° C.] | 70 | 70 | 70 | 70 | 70 | 70 | 70 |
| Temperature polyol [° C.] | 40 | 40 | 40 | 40 | 40 | 40 | 40 |
| Viscosity [mPas] | 590 | 724 | 729 | 635 | 540 | 550 | 660 |
| NCO content [%] | 28.8 | 29.0 | 29.0 | 29.0 | 29.3 | 29.4 | 29.2 |

The viscosity was determined according to DIN 53019 Part 1 at 25° C. and the NCO content according to ISO 14896.

EXAMPLE 3

Production of Metal Composite Elements with PUR/PIR Foam

A PUR/PIR foam was obtained in a conventional procedure on a twin conveyor belt using two steel cover layers according to the recipe given below:
71% by mass of a polyol mixture (in the terminology of the presnt invention, isocyanate-reactive component D) of:
  64 parts by weight of a polyester polyol of phthalic anhydride, adipic acid, diethylene glycol and ethylene glycol having an OH number of 240 mg(KOH)/g (in the terminology of the present invention, polyester polyol D1);
  5 parts by weight of a polyether polyol based on TMP (trimethylolpropane) and ethylene oxide having a functionality of 2 and an OH number of 240 mg(KOH)/g (in the terminology of the present invention, polyether polyol D2); and
  2.2 parts by weight of polyester polyol of phthalic anhydride and diethylene glycol, OH number 795 mg(KOH)/g
Additional Components:
  20% by mass flame retardant TCPP (tris(chloropropyl) phosphate)
  5% by mass flame retardant TEP (triethyl phosphate)
  4% by mass silicone-containing stabiliser
This was reacted with 5 parts by weight of carboxylic acid salt (PIR catalyst) and 13 parts by weight of foaming agent n-pentane (in the terminology of the present invention, component E) in the reaction to the PUR/PIR foam.

An isocyanate component was further used. In the case of Comparison Example 3-1 it is 44V70L already mentioned above, and in Example 3-2 according to the invention it is the prepolymer from Example 2-4 (in the terminology of the present invention, prepolymer C).

The isocyanate component and the isocyanate-reactive component were reacted in Comparison Example 3-1 in a mixing ratio of 100 parts by weight of the isocyanate-reactive component to 190 parts by weight of the isocyanate component, and in Example 3-2 according to the invention in a mixing ratio of 100 parts by weight of the isocyanate-reactive component to 220 parts by weight of the isocyanate component. The test was carried out on a continuously operating plant for the production of metal composite elements.

The adhesion was tested according to standard DIN 53292. The procedure differed from the tensile test perpendicular to the cover layer according to DIN 53292-82 by the different sample thickness and number of cover layers.

The test according to DIN 53292-82 is based on the entire thickness of the cover layers. The weakest region of the sample as a whole thereby determines the rupture site. By contrast, the adhesion test in the modification described here permitted a side-related assessment of the adhesion.

A sample was therefore taken by cutting a composite element perpendicularly to the cover layers. Square samples having a side length of 50 mm and a height of 15 mm (including the cover layer) were used in the measurement.

In order to compare the results from Example 3-1 with Example 3-2, in each case 3 comparison measurements were taken. While average adhesions of 0.15 MPa were measured for Example 3-1, they were in the region of 0.37 MPa for Example 3-2. In a reproduction of this result, it was even possible to determine slightly higher adhesions of >0.40 MPa for test 3-2.

Blistering after tempering at 105° C. for one hour was also tested. A defect-free boundary region between the foam and the metal cover layer was found for test 3-2.

The invention claimed is:

1. An isocyanate-terminated prepolymer C having an NCO content of from ≥26.0% by mass to ≤31.0% by mass, based on the mass of the prepolymer C, obtained from the reaction of
  (i) an isocyanate composition A having a viscosity at 25° C. of from ≥60 mPas to ≤800 mPas, comprising
    from ≥25% by mass to ≤60% by mass monomeric diphenylmethane diisocyanate A1 and
    from ≥40% by mass to ≤75% by mass polymeric diphenylmethane diisocyanate A2,
    wherein the sum of the amounts of components A1 and A2 is ≤100% by mass, with
  (ii) a polyester ether polyol B having an average functionality of from ≥1.9 to ≤2.1 and an OH number of from ≥200 mg(KOH)/g to ≤500 mg(KOH)/g, obtained from the reaction of a dicarboxylic acid and/or a dicarboxylic acid derivative B1 with at least one polyol B2 and with an epoxide B3,
    wherein the polyester ether polyol B is used in amounts of from ≥1.5% by mass to ≤6.0% by mass, based on the sum of the masses of A and B.

2. The prepolymer according to claim 1 having a viscosity at 25° C. of from ≥300 mPas to ≤1600 mPas.

3. The prepolymer according to claim 1, wherein the composition A has a viscosity at 25° C. of from ≥90 mPas to ≤300 mPas and an NCO content of from ≥30% by mass to ≤33% by mass.

4. The prepolymer according to claim 1, wherein the polyester ether polyol B is obtained from the reaction of phthalic anhydride as component B1, diethylene glycol as component B2 and ethylene oxide as component B3.

5. The prepolymer according to claim 1, wherein the NCO content is from ≥27.5% by mass to ≤29.5% by mass.

6. The prepolymer according to claim 2, wherein the viscosity at 25° C. is from ≥500 mPas to ≤1000 mPas.

7. The prepolymer according to claim 1, wherein the polyester ether polyol B having an OH number of from 275 mg(KOH)/g to 325 mg(KOH)/g and a viscosity of 6.5 +/− 1.3 Pa s at 25° C.

8. A polyurethane/polyisocyanurate polymer, obtained from a reaction of a prepolymer C according to claim 1 with an isocyanate-reactive component D.

9. The polyurethane/polyisocyanurate polymer according to claim 8, wherein the molar ratio of isocyanate groups to hydroxyl groups in the reaction mixture of components C and D is from ≥1:1 to ≤5:1.

10. The polyurethane/polyisocyanurate polymer according to claim 8, wherein the reaction of the prepolymer C with the isocyanate-reactive component D takes place in the presence of a foaming agent E.

11. The polyurethane/polyisocyanurate polymer according to claim 8, wherein the isocyanate-reactive component D comprises from ≥50% by mass to ≤95% by mass of a polyester polyol D1 and from ≥5% by mass to ≤50% by mass of a polyether polyol D2, in each case based on the total mass of component D, and wherein further the sum of the amounts of components D1 and D2 is ≤100% by weight.

12. The polyurethane/polyisocyanurate polymer according to claim 11, wherein the polyester polyol D1 has an average functionality of from ≥1.9 to ≤2.1 and an OH number of from ≥220 mg(KOH)/g to ≤270 mg(KOH)/g and further is obtained from the reaction of phthalic acid and/or phthalic anhydride as well as adipic acid, diethylene glycol and ethylene glycol.

13. The polyurethane/polyisocyanurate polymer according to claim 11, wherein the polyether polyol D2 is a polyoxyethylene and/or polyoxypropylene polyol started on trimethylolpropane and having an OH number of from ≥200 mg(KOH)/g to ≤300 mg(KOH)/g.

14. A composite element that comprises a layer comprising a polyurethane/polyisocyanurate polymer according to claim 8 and a cover layer.

15. The composite element according to claim 14, wherein the cover layer comprises a material that is is aluminium, steel, bitumen, paper, a mineral nonwoven, a nonwoven comprising organic fibres, a plastics sheet, a plastics film and/or a wooden panel.

16. The composite element according to claim 14, wherein adhesion strength between the layer comprising a polyurethane/polyisocyanurate polymer and the cover layer is ≥0.20 N/mm².

17. The composite element according to claim 15, wherein the material of the cover layer is steel.

18. A method for foam-insulating and/or promoting adhesion in a composite element, comprising providing a layer comprising the polyurethane/polyisocyanurate polymer according to claim 8 on a cover layer of the composite element.

19. The method according to claim 18, wherein the cover layer is a steel cover layer.

* * * * *